(12) United States Patent
Tanaka et al.

(10) Patent No.: US 9,035,889 B2
(45) Date of Patent: May 19, 2015

(54) INFORMATION PROCESSING APPARATUS AND INFORMATION PROCESSING METHOD

(75) Inventors: Tomonori Tanaka, Ageo (JP); Yasuo Okutani, Kawasaki (JP); Toshiaki Fukada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 479 days.

(21) Appl. No.: 13/214,086

(22) Filed: Aug. 19, 2011

(65) Prior Publication Data

US 2012/0050194 A1    Mar. 1, 2012

(30) Foreign Application Priority Data

Aug. 25, 2010 (JP) ................................. 2010-188485
Jul. 15, 2011 (JP) ................................. 2011-156692

(51) Int. Cl.
G06F 3/041    (2006.01)
G06F 3/042    (2006.01)
G06F 3/0481   (2013.01)

(52) U.S. Cl.
CPC ............ *G06F 3/0425* (2013.01); *G06F 3/0481* (2013.01); *G06F 2203/04108* (2013.01)

(58) Field of Classification Search
USPC ................................................... 345/173, 174
See application file for complete search history.

(56) References Cited

U.S. PATENT DOCUMENTS

2006/0214926 A1 *  9/2006  Kolmykov-Zotov et al. . 345/179

* cited by examiner

*Primary Examiner* — Gerald Johnson
(74) *Attorney, Agent, or Firm* — Canon USA, Inc., IP Division

(57) ABSTRACT

An information processing apparatus may include a detection unit and a switching unit. The detection unit detects an amount of change in a position of an object of interest per a predetermined time period. The switching unit switches between a first mode for determining a first operation position on a display surface based on the position and direction of an object of interest and a second mode for determining a second operation position on the display surface based on a position where the object of interest is in contact with the display surface using the detected amount of change.

13 Claims, 10 Drawing Sheets

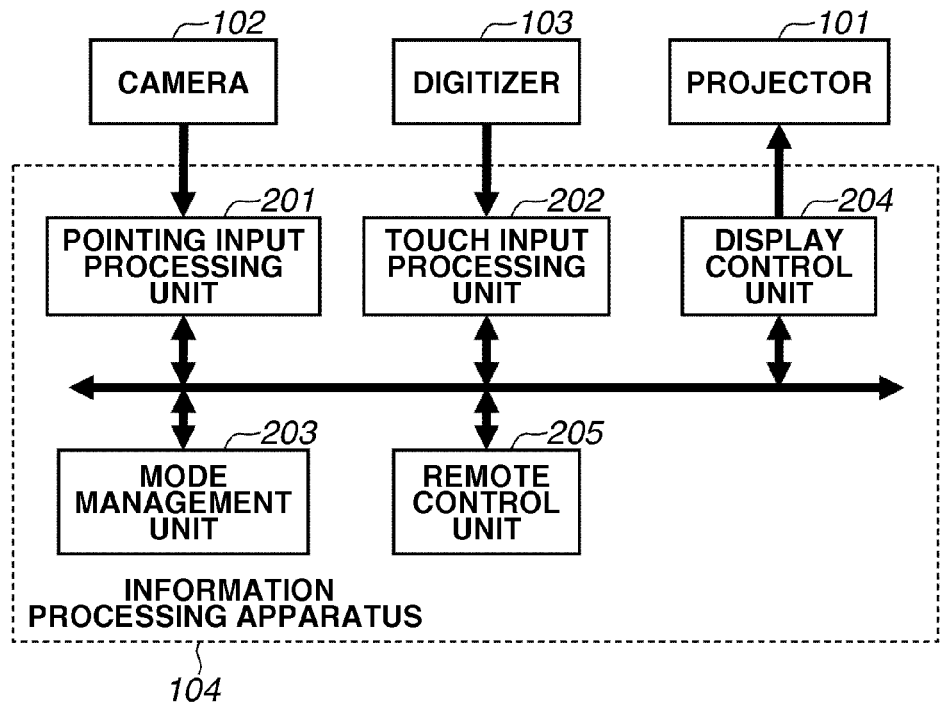
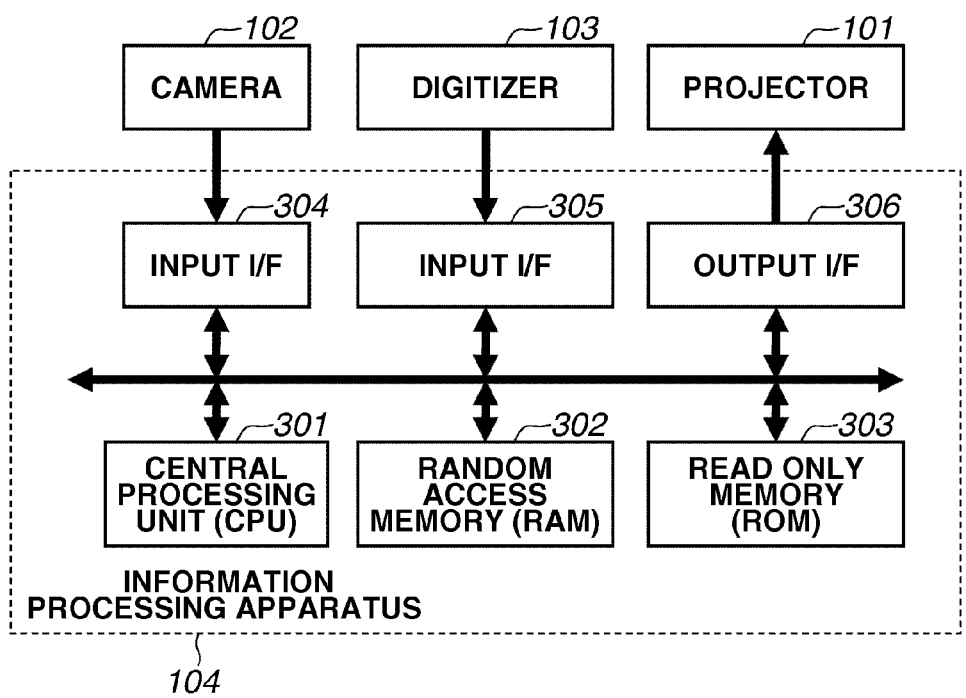

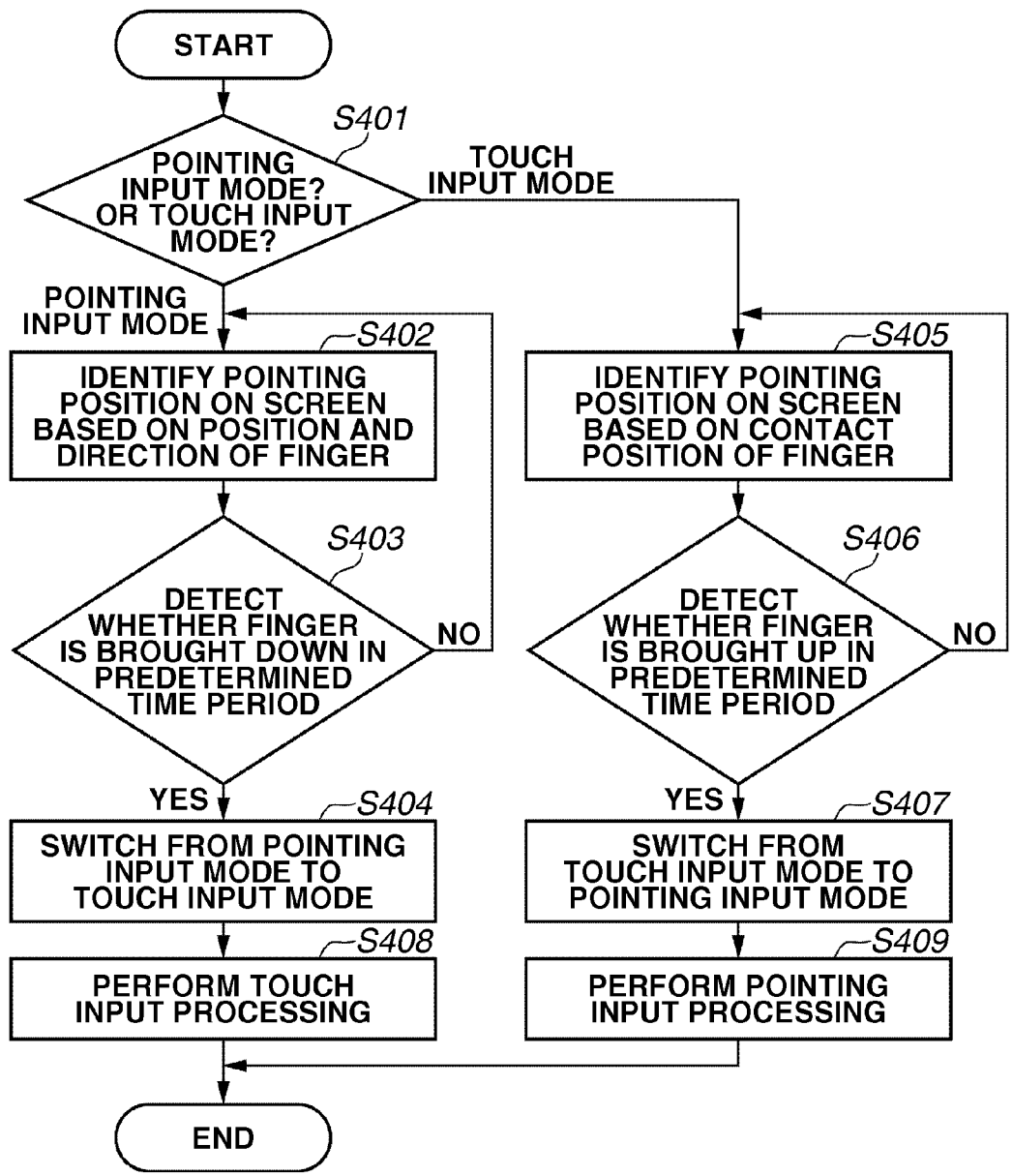

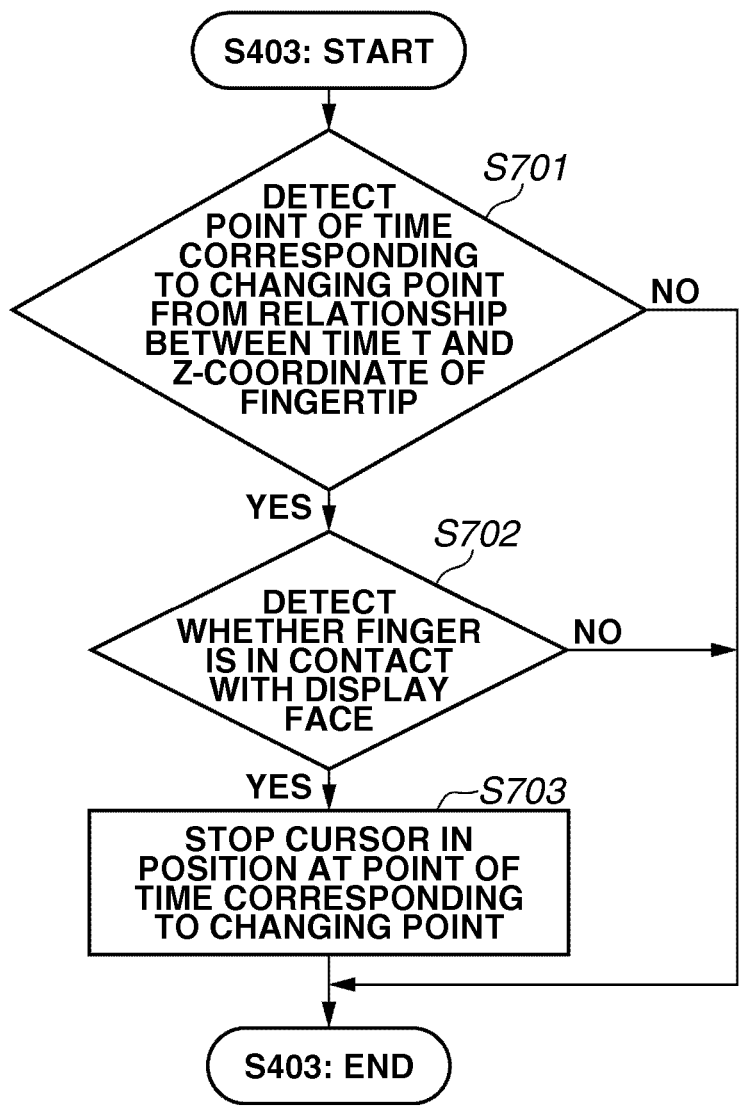

FIG. 8A

| T | X1 | Y1 | Z1 |
|---|---|---|---|
| 0 | 92.75948 | 140.3721 | 22.78571 |
| 40 | 95.88089 | 127.6344 | 44.37736 |
| 80 | 97.58878 | 118.6638 | 47.40625 |
| 120 | 98.94862 | 112.9469 | 48.77434 |
| 160 | 99.62101 | 109.3902 | 48.99157 |
| 200 | 99.67746 | 106.6309 | 47.77056 |
| 240 | 99.99331 | 105.0031 | 47.16816 |
| 280 | 99.63571 | 103.9141 | 47.1056 |
| 320 | 100.0041 | 103.2919 | 46.13092 |
| 360 | 99.73964 | 102.6984 | 45.98513 |
| 400 | 100.5511 | 100.7671 | 45.07275 |
| 440 | 101.185 | 101.064 | 44.57442 |
| 480 | 101.6913 | 99.46662 | 44.11881 |
| 520 | 101.8708 | 98.82833 | 43.68193 |
| 560 | 101.1677 | 98.78627 | 42.81718 |
| 600 | 100.2903 | 98.4161 | 42.31995 |
| 640 | 99.37627 | 98.68203 | 41.86347 |
| 680 | 98.27853 | 99.10956 | 41.22125 |
| 720 | 97.29726 | 99.74131 | 40.68101 |
| 760 | 96.92747 | 99.71489 | 39.96774 |
| 800 | 96.71747 | 101.117 | 39.02891 |
| 840 | 96.3054 | 101.2014 | 38.44386 |
| 880 | 96.2696 | 99.97398 | 38.18888 |

FIG. 8B

| T | X1 | Y1 | Z1 |
|---|---|---|---|
| 920 | 95.93842 | 99.93993 | 38.71538 |
| 960 | 95.60751 | 100.146 | 39.53787 |
| 1000 | 95.3865 | 99.38347 | 38.73779 |
| 1040 | 95.34712 | 99.57706 | 38.06494 |
| 1080 | 95.57412 | 100.2106 | 37.63281 |
| 1120 | 95.42897 | 101.0575 | 37.35705 |
| 1160 | 95.67692 | 100.1182 | 37.03958 |
| 1200 | 96.60915 | 99.78699 | 37.19363 |
| 1240 | 96.95759 | 100.5178 | 37.44933 |
| 1280 | 96.18792 | 100.2029 | 36.98409 |
| 1320 | 96.78921 | 100.5361 | 37.44267 |
| 1360 | 97.19892 | 100.297 | 37.30423 |
| 1400 | 97.00471 | 100.2229 | 37.22444 |
| 1440 | 96.31689 | 101.1779 | 37.45209 |
| 1480 | 96.74319 | 100.9901 | 37.05277 |
| 1520 | 96.17965 | 101.624 | 36.89359 |
| 1560 | 96.29117 | 101.944 | 37.14604 |
| 1600 | 96.74232 | 101.8481 | 35.37838 |
| 1640 | 96.094473 | 103.4893 | 31.70866 |
| 1680 | 95.44598 | 106.2508 | 24.43017 |
| 1720 | 95.0212 | 113.0355 | 16.57922 |
| 1760 | 95.08098 | 117.902 | 11.17708 |
| 1800 | 95.8094 | 125.146 | 4.257669 |

T1 at row 1440; T2 at row 1680

FIG. 8C

| T | X1 | Y1 | Z1 |
|---|---|---|---|
| 1840 | 95.21316 | 128.9774 | 1.669643 |
| 1880 | 93.90012 | 130.2498 | 5.816901 |
| 1920 | 95.20837 | 130.3264 | 8.552486 |
| 1960 | 95.6531 | 130.1525 | 10.57804 |
| 2000 | 96.60871 | 132.2785 | 10.78571 |
| 2040 | 96.93966 | 131.2109 | 7.937984 |
| 2080 | 94.55352 | 135.1794 | 8.51087 |
| 2120 | 96.03829 | 131.287 | 5.018868 |
| 2160 | 94.72991 | 133.8166 | 4.054348 |
| 2200 | 93.52349 | 131.6379 | 3.56 |
| 2240 | 91.69937 | 130.7868 | 2.574074 |
| 2280 | 87.91317 | 131.8234 | 1.640449 |
| 2320 | 86.30145 | 129.6033 | 0.659794 |
| 2360 | 84.5382 | 130.2985 | 1.186813 |
| 2400 | 83.37842 | 131.2946 | 0.911392 |
| 2440 | 79.85591 | 133.2582 | 0.537313 |
| 2480 | 78.98516 | 134.1487 | 0.152778 |
| 2520 | 78.58793 | 136.6461 | 0.067797 |
| 2560 | 79.8026 | 139.0326 | 0.013889 |
| 2600 | 82.17328 | 139.0587 | 0.186047 |
| 2640 | 85.29792 | 137.7367 | 0.685714 |
| 2680 | 90.0433 | 134.112 | 0.278689 |
| 2720 | 88.22377 | 138.5373 | 0.087719 |

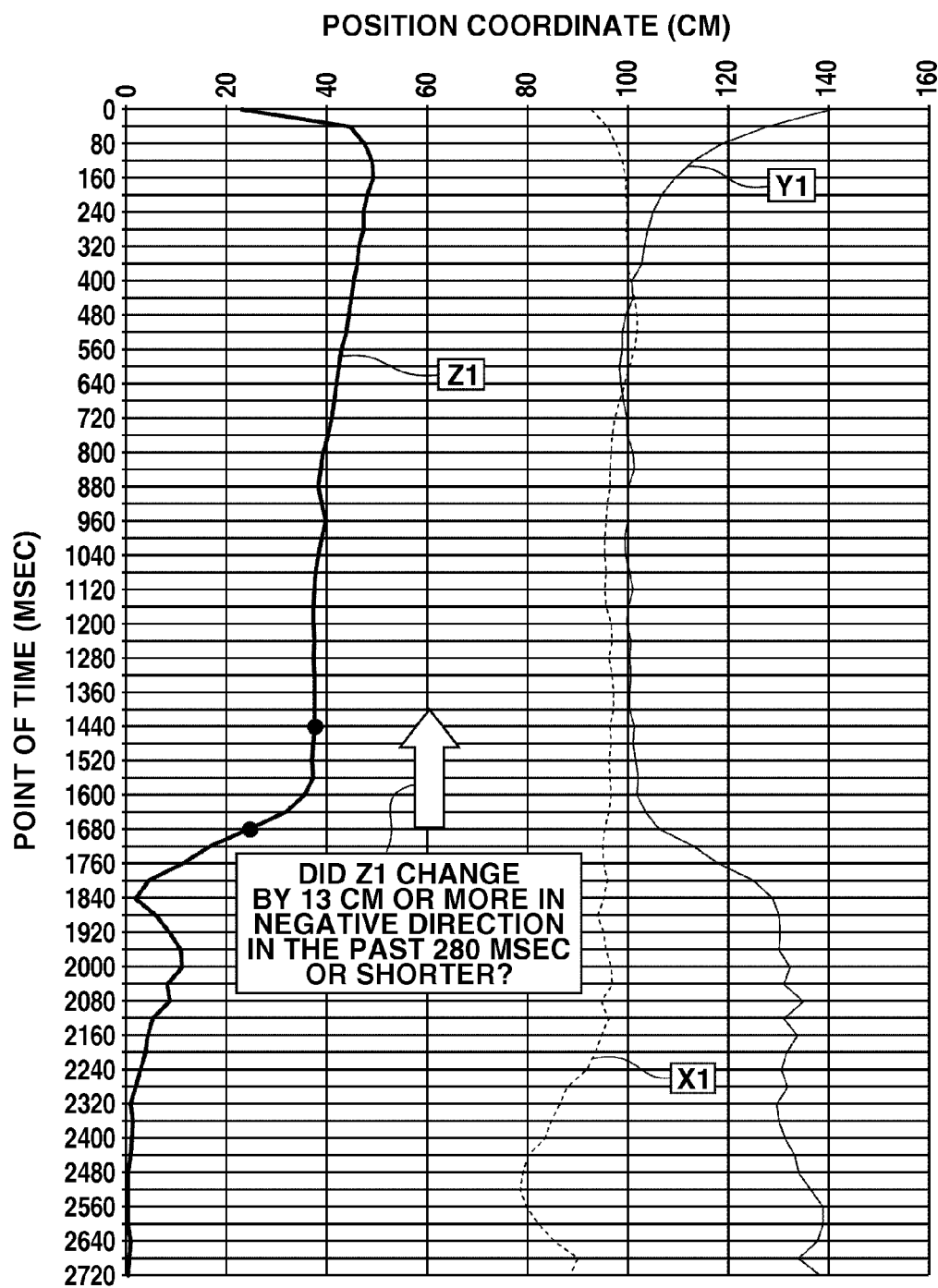

INFORMATION PROCESSING APPARATUS AND INFORMATION PROCESSING METHOD

BACKGROUND OF THE INVENTION

1. Field of the Invention

The present invention relates to a technique for switching an input mode.

2. Description of the Related Art

Conventionally, there has been known a technique in which a touch input operation to a display screen points a predetermined position on the display screen. Furthermore, there has also been known a technique in which pointing input operation to a display screen with a finger points a predetermined position on the display screen.

It is difficult for a pointing input operation to accurately point at a remote object due to the influence of hands movement. Therefore, it is desirable to point at a rough position on the display screen by the pointing input operation and further to perform a touch input operation, thereby pointing at a fine position on the display screen.

However, to perform switching between modes of receiving the pointing input operation and the touch input operation, it has been required to recognize a speech of switching instructions and receive a button operation for switching instructions.

SUMMARY OF THE INVENTION

The present invention is directed to providing switching an input mode based on the movement of a finger itself (an object of interest) performing the pointing input operation.

According to an aspect of the present invention, an information processing apparatus may include a detection unit and a switching unit. The detection unit detects an amount of change in a position of an object of interest per a predetermined time period. The switching unit switches between a first mode for determining a first operation position on a display surface based on the position and direction of an object of interest and a second mode for determining a second operation position on the display surface based on a position where the object of interest is in contact with the display surface using the detected amount of change.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B illustrate a functional block diagram and a hardware configuration of an information processing apparatus.

FIG. 3 illustrates a flow chart indicating the process for switching an input mode.

FIGS. 4A to 4C are flow charts indicating detail processes in steps S402 and S403.

FIGS. 8A to 8C are tables illustrating results in step S502.

FIG. 9 is a graph illustrating results in step S502.

DESCRIPTION OF THE EMBODIMENTS

Various exemplary embodiments, features, and aspects of the invention will be described in detail below with reference to the drawings.

Figure 1A:
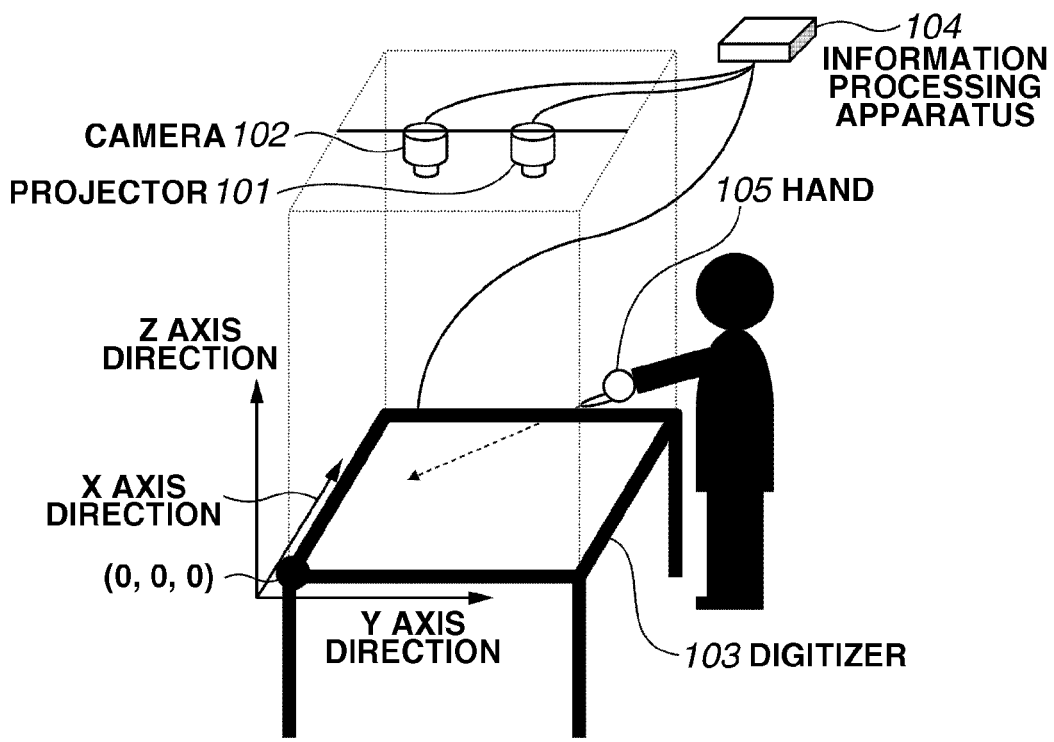
FIGS. 1A and 1B are schematic diagrams illustrating the installation of a system.
Figure 1B:
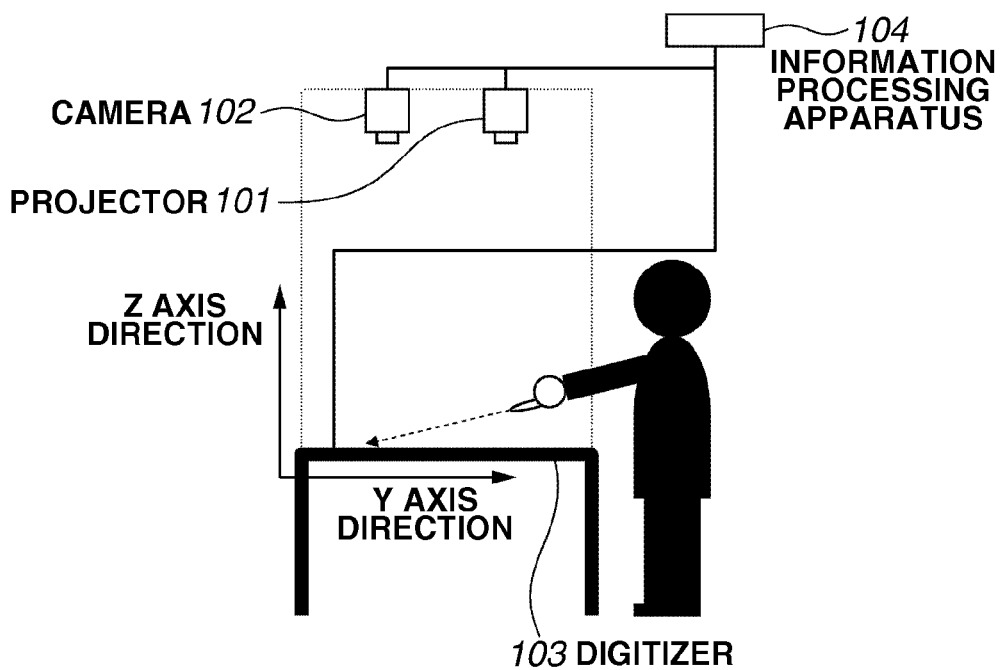

FIG. 1 is a schematic diagram illustrating the installation of a system (an information processing system) according to a first exemplary embodiment. The system includes a projector 101, a camera 102, a digitizer 103, and an information processing apparatus 104. In the present exemplary embodiment, the system in which the above devices collaborate with one another realizes an embodiment, however, a single information processing apparatus having functions corresponding to the above devices may realize an embodiment.

The projector 101 projects a predetermined image onto the digitizer 103 according to the image data output from the information processing apparatus 104. The camera 102 is arranged opposed to the digitizer 103 and captures an object of interest such as the finger of a user. The camera 102 is a range image sensor for outputting a range image. The range image refers to an image whose each pixel has a pixel value according to a distance between the camera 102 and an object of interest in a space.

For example, a time-of-flight (TOF) measurement method in which infrared rays are emitted and time until light reflected by an object reaches is measured is applied to a method for measuring a distance. A plurality of range images output at points of time different from each other is compared to allow identifying the moving distance and the moving direction of the object of interest. The camera 102 has a function to recognize an object with a predetermined shape and is capable of recognizing the shape of user's hand (such as a fingertip, the base of a finger, and others).

In the present exemplary embodiment, various shapes of a human being and a hand are stored in a storage device (RAM) as a model to realize the above recognition functions. The information processing apparatus 104 may also be provided with a function to recognize an object with a predetermined shape.

The digitizer 103 detects the position of an object brought into contact with the digitizer 103. The digitizer 103 functions as a display surface for the image projected by the projector 101. The information processing apparatus 104 acquires the range image from the camera 102 and information about contact position from the digitizer 103, executes the after-mentioned processing, and outputs predetermined image data to the projector 101.

In the present exemplary embodiment, the digitizer 103 is rectangular and 190 cm in length (X-axis direction) and 150 cm in width (Y-axis direction). For the three-dimensional space over the digitizer 103, a point P1 corresponding to the corner of the digitizer 103 is set to an original point (0, 0, 0), the width direction is set to a Y-axis direction, the length direction is set to an X-axis direction, and the height direction is set to a Z-axis direction (passing the original point and being orthogonal to the XY plane). In the present exemplary embodiment, points P2 and P3 corresponding to other corners of the digitizer 103 are set to (190, 0, 0) and (0, 150, 0). The coordinate is in cm.

FIG. 2A illustrates a functional block diagram of the information processing apparatus 104. The information processing apparatus 104 includes a pointing input processing unit 201, a touch input processing unit 202, a mode management unit 203, a display control unit 204, and a remote control unit 205. The information processing apparatus 104 is connected to the projector 101, the camera 102, and the digitizer 103. The pointing input processing unit 201 is comprised of a CPU and others, obtains the position of an object of interest (a finger in the present exemplary embodiment) and the direction of the object of interest (the direction of a finger in the present exemplary embodiment) from the range image output by the camera 102, and identifies a predetermined position over the digitizer 103 (display surface).

Figure 5:
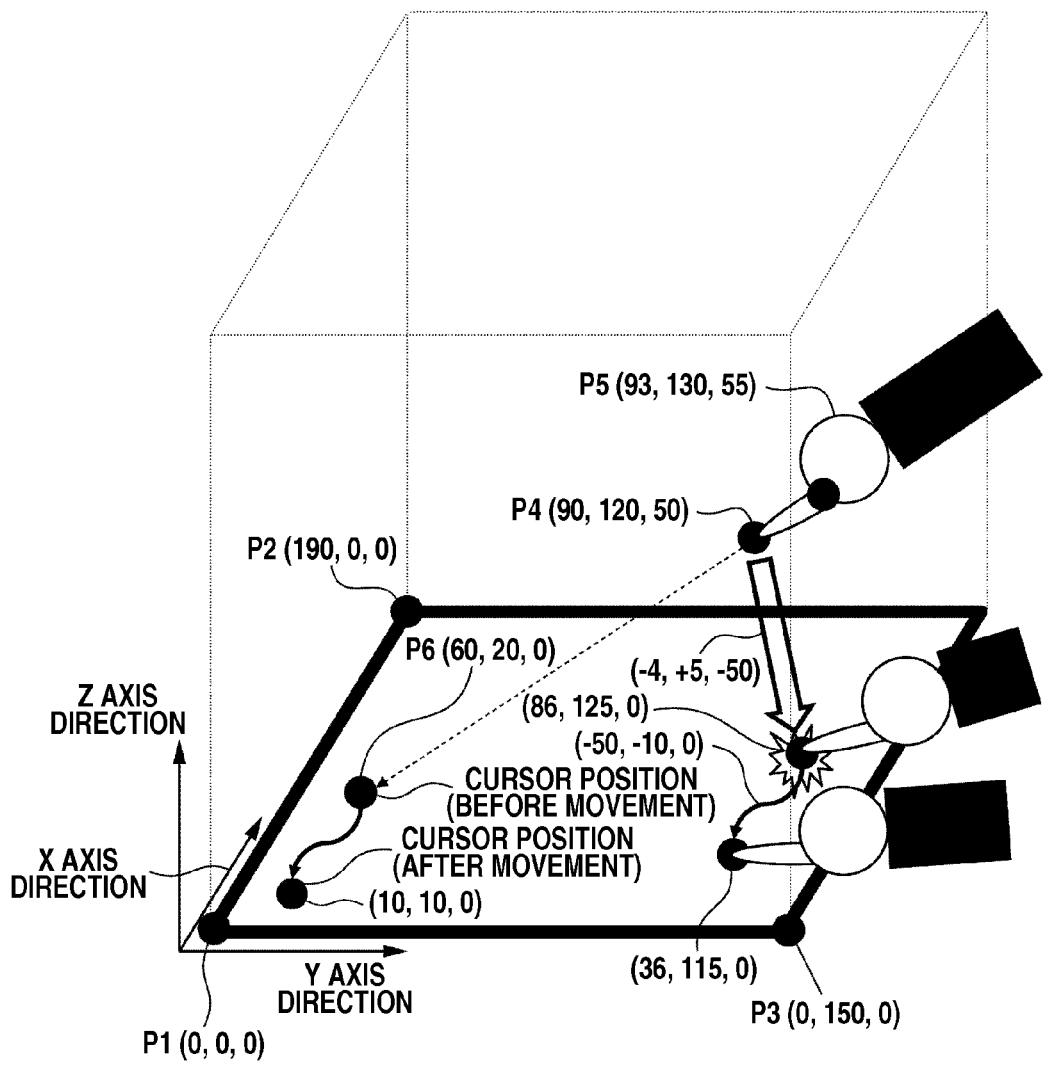
FIG. 5 is a schematic diagram illustrating that an input mode is switched.

In the three-dimensional spatial coordinate system illustrated in FIG. 5, for example, it is assumed that the position coordinate P4 of a fingertip is obtained as (90, 120, 50) by the pointing input processing unit 201 and the position coordinate P5 of the bottom of a finger is obtained as (93, 130, 53). In this case, the intersection (60, 20, 0) of the straight line connecting the position coordinate of the fingertip with the position coordinate of the base of the finger and the face corresponding to the digitizer 103 (display surface) is identified as a pointing position (an operation position).

The pointing input processing unit 201 manages the history of information indicating pointing input. In the present exemplary embodiment, although the pointing input is performed using a finger, the pointing input may be performed using a pen tip. Pointing may be performed using a pointing device such as laser pointer. The touch input processing unit 202 is comprised of a CPU and recognizes contact with the digitizer 103. The touch input processing unit 202 manages the history of information indicating touch input.

The mode management unit 203 is comprised of a CPU and has a function to switch between the pointing input mode and touch input mode. In the pointing input mode, the position identified by the pointing input processing unit 201 is pointed. In the touch input mode, the position at which contact with the digitizer 103 is detected as the position identified by the touch input processing unit 202 is pointed. The display control unit 204 is comprised of a CPU and an output I/F and outputs a predetermined image data to the projector 101. The remote control unit 205 is comprised of a CPU and a RAM and executes control for remotely controlling the pointing position described later.

FIG. 2B illustrates a hardware configuration of the information processing apparatus 104. The information processing apparatus 104 includes a central processing unit (CPU) 301, a random access memory (RAM) 302, a read only memory (ROM) 303, an input interface (I/F) 304, an input I/F 305, and an output I/F 306. The information processing apparatus 104 is connected to the projector 101, the camera 102, and the digitizer 103.

The CPU 301 develops the program stored in the ROM 303 in the RAM 302 and executes the program, realizing each function of the information processing apparatus 104. The RAM 302 provides a storage area required for the operation of the above program. The ROM 303 stores program and data for realizing the operation process of the above program. The interface I/F 304 acquires range image from the camera 102. The input I/F 305 acquires information indicating contact position from the digitizer 103. The output I/F 306 outputs predetermined image data to the projector 101. The above devices function in collaboration with one another via a system bus.

FIG. 3 illustrates a flow chart indicating the process for switching the input mode. In step S401, the mode management unit 203 determines whether the input mode is the pointing or the touch input mode. In step S401, if contact with the digitizer 103 is detected, the mode management unit 203 determines that the input mode is the touch input mode and executes the processing in step S405. On the other hand, if contact with the digitizer 103 is not detected, the mode management unit 203 determines that the input mode is the pointing input mode and executes the processing in step S402. In step S402, the pointing input processing unit 201 captures the finger of the user as the object of interest and identifies the pointing position on the display surface (the digitizer 103) based on the position and direction of the object of interest (the finger).

In step S403, the pointing input processing unit 201 detects whether the finger is brought down based on the range images output at points of time different from each other. More specifically, in step S403, the pointing input processing unit 201 determines whether the amount of movement (amount of change) of the fingertip in the direction perpendicular to the digitizer 103 (display surface) per a predetermined time period (280 msec, for example) is equal to or more than a predetermined distance (13 cm, for example) in the direction close to the display surface. If the pointing input processing unit 201 detects that the finger is brought down (YES in step S403), the processing in step S404 is executed. If the pointing input processing unit 201 detects that the finger is not brought down (NO in step S403), the processing in step S402 is executed.

In step S404, the mode management unit 203 executes the processing for switching the input mode from the pointing input mode to the touch input mode. In step S408, the touch input processing unit 202 performs the touch input processing.

In step S405, the touch input processing unit 202 identifies the pointing position based on the contact position of the finger on the display surface (the digitizer 103). Specifically, for example, the position where the digitizer 103 is brought into contact with the fingertip is the pointing position. In step S406, the pointing input processing unit 201 detects whether the finger is brought up. More specifically, in step S406, the pointing input processing unit 201 determines whether the amount of movement (amount of change) of the fingertip in the direction perpendicular to the digitizer 103 (display surface) per a predetermined time interval (280 msec, for example) is equal to or more than a predetermined distance (13 cm or more, for example) in the direction away from the display surface.

If the pointing input processing unit 201 detects that the finger is brought up (YES in step S406), the processing in step S407 is executed. If the pointing input processing unit 201 detects that the finger is not brought up (NO in step S406), the processing in step S405 is executed. In step S407, the mode management unit 203 performs switching from the touch input mode to the pointing input mode. In step S409, the pointing input processing unit 201 performs the pointing input processing. In other words, the processing in steps S401 to S407 allows switching between the pointing input mode and the touch input mode by the operation with a single finger.

The determination methods in steps S403 and S406 are not limited to the above ones. For example, instead of the above processing in step S403, the pointing input processing unit 201 acquires the gradient (s1) of the straight line obtained by the linear approximation of the fingertip position detected from the reference point of time to the current point of time. Then, the pointing input processing unit 201 acquires the gradient (s2) of the straight line obtained by the linear approximation of the fingertip position detected from the reference point of time to the point of time retrospective by a predetermined amount of time and compares both gradients. If the value of S2/s1 is equal to or greater than a predetermined threshold, the pointing input processing unit 201 may determine that the finger is brought down. Furthermore, instead of the above processing in step S406, the pointing input processing unit 201 acquires the gradient of the straight line obtained by the linear approximation of the fingertip position detected at from the reference point of time to the current point of time. Then, the pointing input processing unit 201 acquires the gradient of the straight line obtained by the linear approximation of the fingertip position detected at from the reference point of time to the point of time retrospective by a predetermined amount of time and compares both gradients. Thereby, the pointing input processing unit 201 may detect whether the finger is brought up.

Figure 4A:
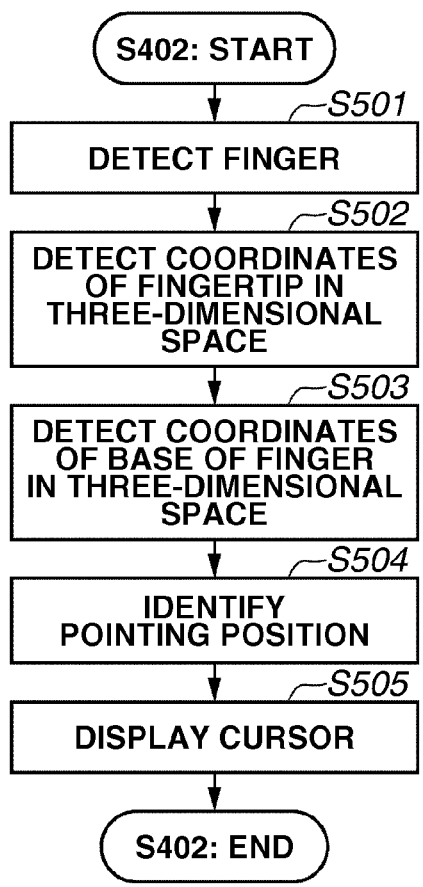

Processing methods (S501 to S505) in step S402 are described in detail below using FIG. 4A. FIG. 4A is a flow chart illustrating the procedure of internal processing in step S402. In step S501, the pointing input processing unit 201 detects the point P4 of the fingertip (index finger) of a hand 105 and the point P5 of the base thereof from the image captured by the camera 102. In step S502, the pointing input processing unit 201 recognizes the distance and direction from the original point with respect to the point P4 of the fingertip from the image captured by the camera 102. The pointing input processing unit 201 identifies the coordinates of the point P4 of the fingertip in the three-dimensional space. The pointing input processing unit 201 acquires also temporal information from the image captured by the camera 102 to associate the temporal information with the coordinates in the three-dimensional space. The pointing input processing unit 201 continues to acquire temporal information and coordinates in the three-dimensional space at a predetermined time interval and stores the acquired temporal information and coordinates in the three-dimensional space in a storage unit.

FIG. 8 is a table illustrating results obtained from the processing in step S502. The table lists the X-coordinate X1, the Y-coordinate Y1, and the Z-coordinate Z1 of the point P4 with respect to time T (units in msec). FIG. 9 is a graph of the information illustrated in FIG. 8. The horizontal axis in FIG. 9 represents time T and the vertical axis represents the X-coordinate X1, the Y-coordinate Y1, and the Z-coordinate Z1. The point of time when the user protrudes the index finger of the hand 105 and starts the pointing input is set to T=0. Moment at which the index finger is protruded is detected from the captured image.

In step S503, the pointing input processing unit 201 identifies the coordinates of the point P5 of the base of a finger in the three-dimensional space in the manner similar to that in step S502. The pointing input processing unit 201 acquires also temporal information to associate the temporal information with the coordinates in the three-dimensional space in the manner similar to that in step S502. In step S504, the pointing input processing unit 201 takes the intersection P6 of the straight line connecting the point P4 to the point P5 and the XY plane as a pointing position. The equation of the straight line connecting the point P4 to the point P5 is obtained and the X-coordinate X3 and the Y-coordinate Y3 at which the Z-coordinate becomes 0 are obtained. In step S505, the projector 101 being a display unit displays a cursor on the point P6. The pointing input processing unit 201 continues to identify the pointing position during the period of the pointing input mode and a cursor is displayed during the period.

The pointing position refers to a position at which the user points by touching or indicating with the finger. The cursor is a symbol displaying the pointing position on the display. A cursor position is a position of the cursor before a transition from the pointing mode to the touching mode and the pointing position before the transition. After the transition, the position on this side at which the user points is reflected in the movement of a remote cursor position.

Figure 4B:
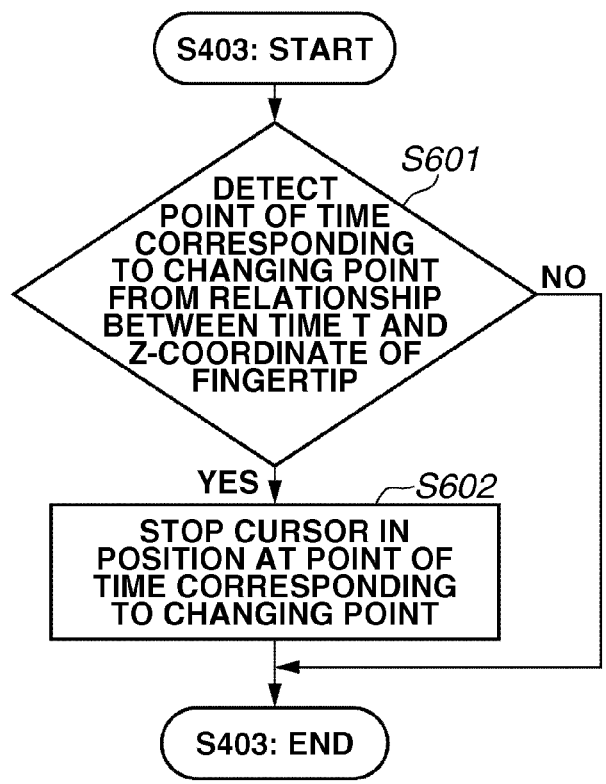

Processing methods (S601 to S602) in step S403 are described in detail below. FIG. 4B is a flow chart describing the procedure of internal processing in step S403. In step S601, the pointing input processing unit 201 detects a changing point from the relationship between the time T and the amount of change in the fingertip stored in the storage unit. If the pointing input processing unit 201 detects the predetermined amount of change in a fingertip during a predetermined time period (YES in step S601), the processing in step S602 is performed. If the pointing input processing unit 201 does not detect a changing point (NO in step S601), a series of the processing is ended.

In the present exemplary embodiment, the processing in step S602 is performed when an interval during which the Z-coordinate Z1 is decreased by a predetermined distance (13 cm in the present exemplary embodiment) or longer within from the point of time when measurement is started (T=0) to a predetermined time period (280 msec in the present exemplary embodiment) or shorter is detected for the first time. As shown in FIG. 8B, since the amount of change in the Z-coordinate Z1 is decreased by 13.02192 in the range between T1 (T=1440 msec) and T2 (T=1680 msec), the processing in step S602 is performed. The point of time corresponding to the point of time T1 is taken as a changing point. In step S602, the cursor is stopped at the position where the changing point is detected in step S601.

In a case where the processing in step S602 is not performed, the pointing position is moved in line with the user's finger being brought down. The processing in step S602 is performed to achieve an effect capable of switching the pointing input mode to the touch input mode with the user-intended pointing position maintained. The processing method in step S406 is described below. As is the case with the processing in step S501, the coordinate of the point P4 of fingertip (index finger) of the hand 105 in the three-dimensional space is identified from the image captured by the camera 102. As is the case with the processing in step S404, a changing point is detected from the relationship between the time T and the amount of change in the fingertip. If a predetermined amount of change in a fingertip is detected during a predetermined time period, the processing in step S408 is performed. If the changing point is not detected, the processing in step S601 is continued.

In the present exemplary embodiment, the processing in step S407 is performed when an interval during which the Z-coordinate Z1 is increased by 13 cm or longer within from the point of time when measurement is started (T=0) to 280 msec or shorter is detected for the first time. Detailed description using data is made in steps S403 and S404, so that the description of step S407 is omitted herein.

Figure 6:
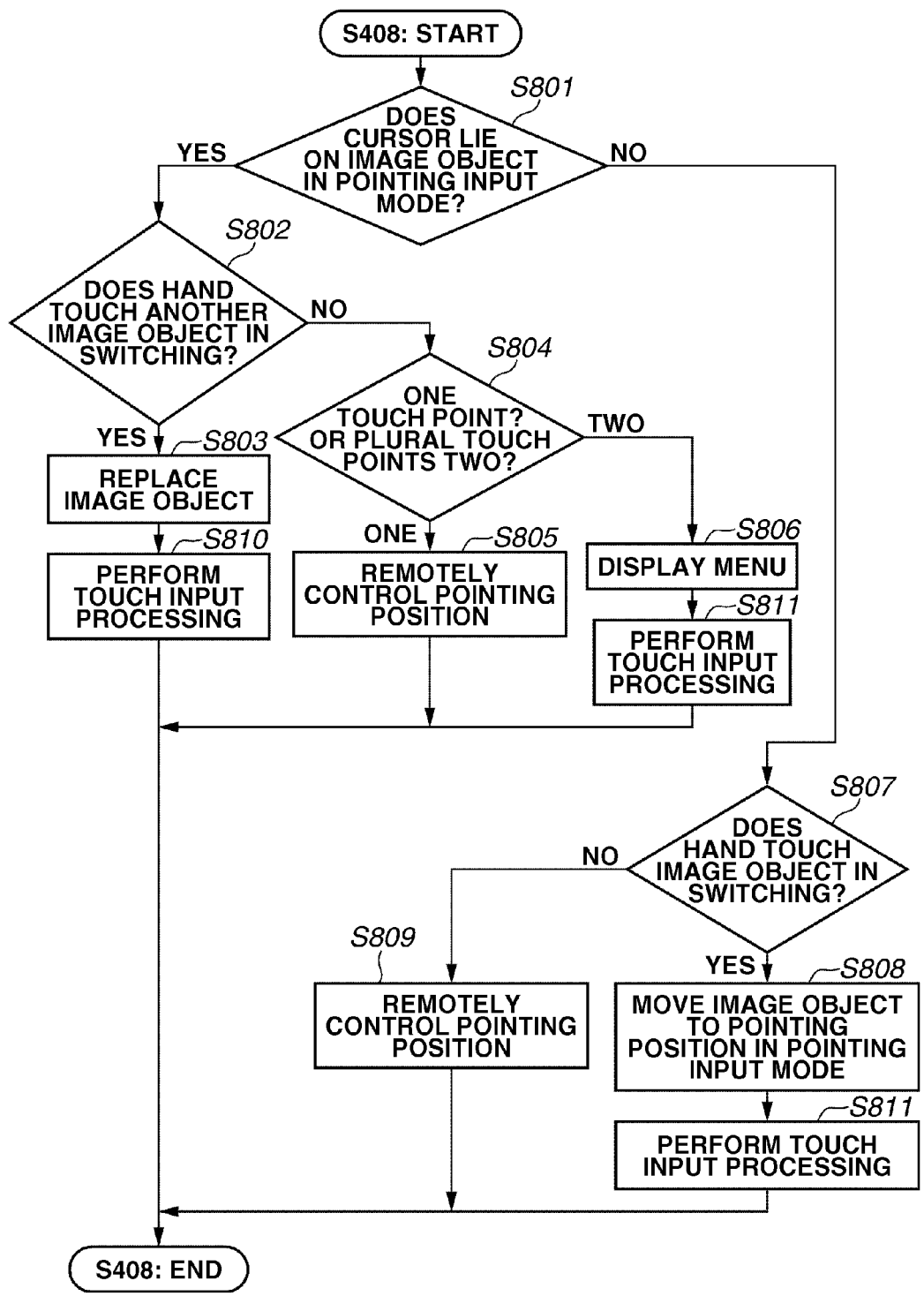
FIG. 6 is a flow chart indicating detail process in step S404.

The processing in step S408 is described in detail below. FIG. 6 is a flow chart illustrating the procedure of internal processing in step S408. In FIG. 6, "pointing input mode" denotes time at which the pointing position is identified in step S504 and the point of time T1. "switching" denotes time at which the pointing position is identified in step S602 and the point of time T2.

Figure 7:
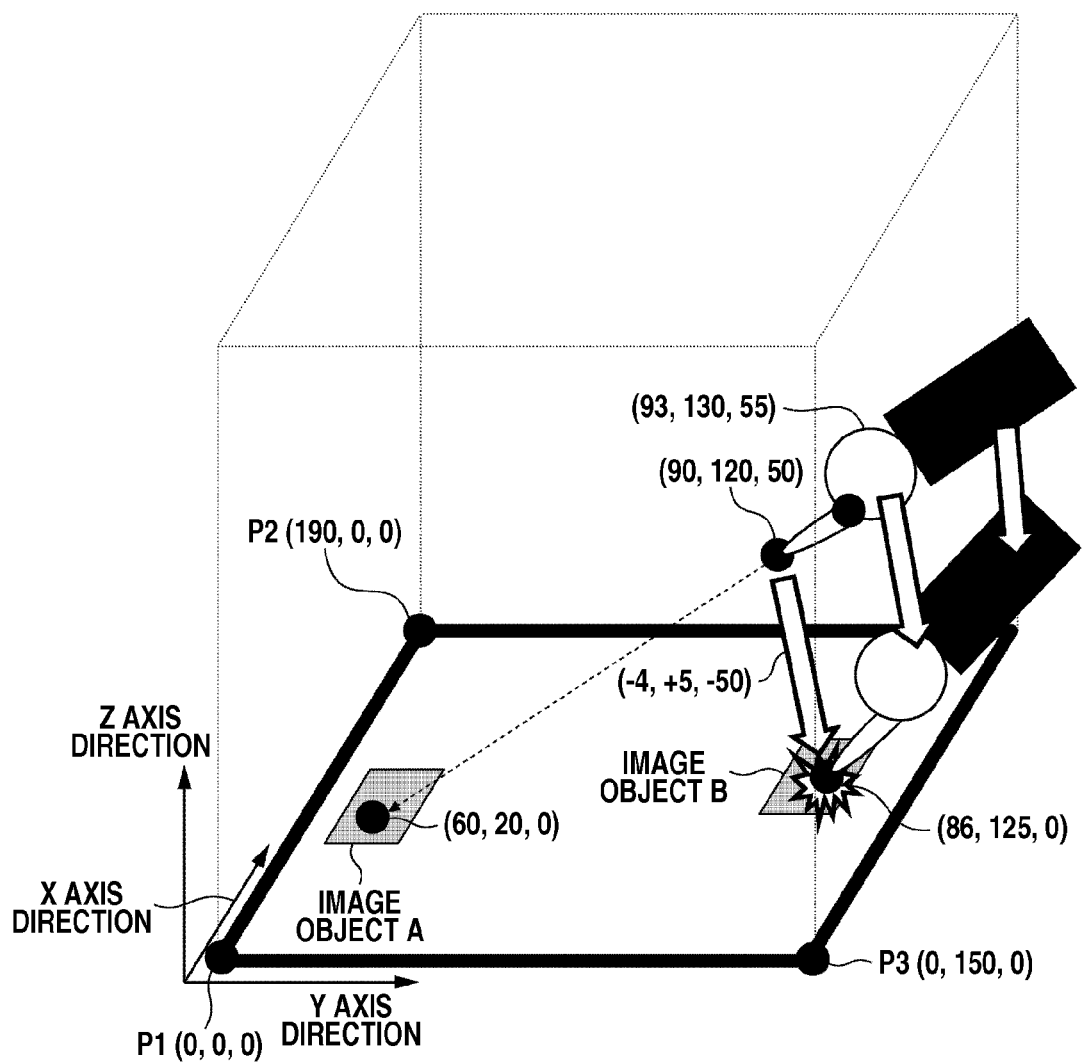
FIG. 7 is a schematic diagram illustrating that an input mode is switched.

In step S801, the touch input processing unit 202 determines whether the pointing position identified at the time of the pointing input mode (step S504) lies on an image object. The image object denotes a partial image movable on the screen among partial images displayed on the screen, for example, a photograph, icon, and document. If the pointing position lies on an image object A at the time of the pointing input mode (YES in step S801), as illustrated in FIG. 7, the processing in step S802 is performed.

If the pointing position does not lie on the image object A at the time of the pointing input mode (NO in step S801), the processing in step S807 is performed. In step S802, the touch input processing unit 202 determines whether the hand 105 (subjected to the pointing input processing) touches another image object at the time of switching the pointing input mode to the touch input mode in step S404. If the hand 105 touches a position different from the image object (NO in step S802), the processing in step S804 is performed. Further if the hand 105 touches the image object B at the time of switching (YES in step S802) as illustrated in FIG. 7, for example, the processing in step S803 is performed. In step S803, the image object A is replaced with the image object B and the touch input processing is performed in step S810.

In step S804, the touch input processing unit 202 determines the number of the fingers that touch the points in step S802. If the number of touch points is one, the processing in step S805 is performed. If the number of touch points is two, the processing in step S806 is performed. In step S805, the pointing position identified immediate before the pointing input mode is operated by touch input in the touch input mode. In step S806, a menu related to the image object A is displayed in the touch input mode. For example, touch input is performed in the positive direction of the X-axis to display a menu related to the change of an image size. In step S811, the touch input processing is performed. In step S807, the touch input processing unit 202 determines whether the hand 105 touches the image object when the pointing input mode is switched to the touch input mode in step S404. If the hand 105 touches the image object B, for example, (YES in step S807), the processing in step S808 is performed. If the hand 105 does not touch the image object B (NO in step S807), the processing in step S809 is performed. In step S808, the image object B is moved to the pointing position identified in the pointing input mode. In step S811, the touch input processing is performed.

In steps S805 and S809, the pointing position identified in the pointing input mode is operated by touch input in the touch input mode. It is difficult to perform operation such as accurate pointing at a remote image object or movement by the pointing input due to the influence of hands movement. Rough pointing at an image is performed by the pointing input and then detailed pointing operation is performed by touch operation on a table. This achieves an effect capable of accurately operating a remote image object.

At the time of performing a remote operation in steps S805 and S809, the image object around the pointing position identified in the pointing input mode may be copied into a touch input area to allow performing the remote operation. Thereby, the user can perform touch input, while watching the hand, into an image object in an area which cannot be usually operated by touch.

FIG. 5 is a schematic diagram illustrating that a remote image object is operated by switching the input mode. In FIG. 5, the cursor position P6 is determined as the operation position on the screen (on the display surface) based on the position and direction of the finger (index finger) obtained from the position coordinate P4 of the fingertip and the position coordinate P5 of the base of the finger. When the amount of change in the direction perpendicular to the display surface among the amount of change in position of a finger (fingertip) per a predetermined time period (280 msec, for example) is equal to or more than a predetermined threshold (13 cm, for example) in the direction close to the display surface, the following processing is executed. Specifically, for example, the cursor position is stored at the point of time corresponding to the starting point of the predetermined time period during which the amount of change being equal to or more than the predetermined threshold is detected. The position is determined where the position at which the contact between finger and the display surface is detected, as illustrated in FIG. 5, the cursor position is moved according to user's operation for moving the contact position. The operation in which the cursor position is moved according to user's operation for moving the contact position is executed based on the control by the remote control unit 205.

In the present exemplary embodiment, the processing illustrated in FIG. 4C may be executed instead of the processing in step S403 illustrated in FIG. 4B. In step S701, as is the case with step S601, the pointing input processing unit 201 executes the processing for detecting a changing point from the relationship between the time T and the amount of change in the fingertip. If a predetermined amount of change in the fingertip is detected within a predetermined time period (YES in step S701), the processing in step S702 is performed. If a changing point is not detected (NO in step S701), a series of processes is ended. In step S702, the pointing input processing unit 201 determines whether a tap by the user (contact between the digitizer and the hand) is detected. If a tap is detected (YES in step S702), the processing in step S703 is performed. If a tap is not detected (NO in step S702), a series of processes is ended. In step S703, the pointing position is returned to the position where the changing point is detected in step S701.

In the present exemplary embodiment, in step S402, the intersection of the straight line connecting the fingertip with the point of base of the finger and the XY plane is set to a pointing position. In the embodiments, the intersection of the straight line connecting the fingertip with the point of center of gravity of a user's head, instead of the base of the finger, and the XY plane maybe set to a pointing position. In the present exemplary embodiment, the length of the digitizer, a pointing position, a distance over which a finger is brought down, and a time period are merely examples. Such length, position, distance, and time period may be appropriately set.

In the present exemplary embodiment, the projector is used to display image data, but a display unit such as a display may be used instead of the projector.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable medium may store a program that causes an information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-188485 filed Aug. 25, 2010 and Japanese Patent Application No. 2011-156692 filed Jul. 15, 2011, which are hereby incorporated by reference herein in its entirety.

What is claimed is:

1. An information processing apparatus comprising:
a detection unit configured to detect an amount of change in a position of an object of interest per a predetermined time period; and
a switching unit configured to switch between a first mode for determining a first operation position on a display surface based on a direction of a line through a tip of the object of interest and a second mode for determining a second operation position on the display surface based on a position where the object of interest is in contact with the display surface according to the amount of change by the detection unit.

2. The information processing apparatus according to claim 1, wherein the switching unit switches between the first and second modes in a case where an amount of change in a direction perpendicular to the display surface per a predetermined time period among the amount of change in the position of the object of interest per the predetermined time period is equal to or more than a predetermined threshold.

3. The information processing apparatus according to claim 1, further comprising:
a control unit configured to execute processing for the second operation position according to a user's operation to the first operation position in a predetermined point of time included in a predetermined time period during which the object of interest moved in a direction perpendicular to the display surface at a faster speed that is faster than the predetermined speed, in a case where the first mode is switched to the second mode.

4. A computer storing a computer program for causing the computer to function as units of an information processing apparatus according to claim 1.

5. The information processing apparatus according to claim 1,
wherein the switching unit, in a case where the amount of change detected by the detection unit indicates that the object of interest moved in a direction close to a display surface at a faster speed that is faster than a predetermined speed, switches the first mode to the second mode while maintaining the first operation position immediately before the amount of change is detected by the detection unit, and, in a case where the amount of change detected by the detection unit indicates that the object of interest moved in a direction close to a display surface at a lower speed than the predetermined speed, the switching unit continues the first mode without switching to the second mode.

6. The information processing apparatus according to claim 1,
wherein the object of interest is a finger of a user,
wherein in the first mode, a point where a line connecting a position coordinate of a fingertip with a position coordinate of a base of the finger intersects the display surface is determined as the first operation position on the display surface.

7. The information processing apparatus according to claim 1,
wherein the switching unit switches the first mode to the second mode in a case where the amount of change detected by the detection unit indicates that the object of interest moved in a direction close to a display surface at a faster speed that is faster than a predetermined speed.

8. The information processing apparatus according to claim 1,
wherein the switching unit switches the second mode to the first mode in a case where the amount of change detected by the detection unit indicates that the object of interest moved in a direction away from the display surface at a faster speed that is faster than the predetermined speed.

9. An information processing method comprising:
detecting an amount of change in a position of an object of interest per a predetermined time period; and
switching between a first mode for determining a first operation position on a display surface based on a direction of a line through a tip of the object of interest and a second mode for determining a second operation position on the display surface based on a position where the object of interest is in contact with the display surface according to the detected amount of change.

10. The information processing method according to claim 9, wherein switching includes switching between the first and second modes in a case where an amount of change in a direction perpendicular to the display surface per a predetermined time period among the amount of change in the position of the object of interest per the predetermined time period is equal to or more than a predetermined threshold.

11. The information processing method according to claim 9, further comprising:
executing processing for the second operation position according to a user's operation to the first operation position in a predetermined point of time included in a predetermined time period during which the object of interest moved in a direction perpendicular to the display surface at a faster speed that is faster than the predetermined speed, in a case where the first mode is switched to the second mode.

12. A non-transitory computer-readable medium storing a program to cause an information processing apparatus to perform the information processing method according to claim 11.

13. The information processing method according to claim 9, further comprising:
wherein switching includes, in a case where the detected amount of change indicates that the object of interest moved in a direction close to a display surface at a faster speed that is faster than a predetermined speed, switching the first mode to the second mode while maintaining the first operation position immediately before the amount of change is detected, and, in a case where the detected amount of change indicates that the object of interest moved in a direction close to a display surface at a lower speed than the predetermined speed, switching includes continuing the first mode without switching to the second mode.

* * * * *